US006296568B1

(12) United States Patent
Tracy

(10) Patent No.: US 6,296,568 B1
(45) Date of Patent: Oct. 2, 2001

(54) PYRAMID-STYLE VIDEO GAME METHOD AND DEVICE

(76) Inventor: Mark E. Tracy, 5225 E. Charlestson, #2106, Las Vegas, NV (US) 89122

( * ) Notice: Subject to any disclaimer, the term of this patent is extended or adjusted under 35 U.S.C. 154(b) by 0 days.

(21) Appl. No.: 09/410,590

(22) Filed: Oct. 1, 1999

Related U.S. Application Data

(60) Provisional application No. 60/102,622, filed on Oct. 1, 1998.

(51) Int. Cl.$^{7}$ ........................................ A63F 13/00

(52) U.S. Cl. ........................ 463/17; 463/16; 273/237; 273/242; 273/243; 273/121 B

(58) Field of Search ........................ 273/121 B, 118 R, 273/119 A, 121 A, 236–238, 124 R, 124 A, 123 A, 118 A, 108.1, 138.1–139, 138.2, 463, 16, 17, 18, 31, 242, 243; 463/16, 17

(56) References Cited

U.S. PATENT DOCUMENTS

| | | | |
|---|---|---|---|
| 503,942 | 8/1893 | Buchanan | 273/138.3 |
| 513,224 | 1/1894 | Young | 194/301 |
| 1,053,473 | 2/1913 | Breyfogle | 194/294 |
| 3,375,912 | 4/1968 | Weitzman | 194/346 |
| 4,711,453 | * 12/1987 | Saint Yve | 273/268 |
| 5,016,879 | * 5/1991 | Parker et al. | 273/126 A |
| 5,120,060 | * 6/1992 | Parker et al. | 273/138 A |
| 5,413,342 | * 5/1995 | Kaplan | 273/143 B |
| 5,540,441 | * 7/1996 | Ilan et al. | 273/269 |
| 6,139,013 | * 10/2000 | Pierce et al. | 273/121 B |

* cited by examiner

*Primary Examiner*—Jessica J. Harrison
*Assistant Examiner*—Yveste G. Cherubin
(74) *Attorney, Agent, or Firm*—Quirk & Tratos

(57) ABSTRACT

A video game complete with player wagering includes a processor and a display controlled by the processor. Said display is a game board in the form of a pyramid having an apex, a base and a plurality of pins displayed on the game board. Also displayed at the base is a plurality of locations each defining an outcome for the game. During play, a character is displayed falling from the apex to the base being directed by contact with the pins. The game payout is dependent upon the base location ultimately occupied by the character. In a preferred embodiment the pins can be programmed as stop pins, lateral shift pins or bonus pins. Upon contact with the character the stop pin will end the game with no payout, the lateral shift pin will move the character to the left or right and the bonus pin will cause a bonus payout.

13 Claims, 4 Drawing Sheets

| | BET 1 UNIT | BET 2 UNITS | BET 3 UNITS | BET 4 UNITS | BET 5 UNITS |
|---|---|---|---|---|---|
| | 0 | 0 | 0 | 0 | 0 |
| | 1 | 2 | 3 | 4 | 5 |
| | 2 | 4 | 6 | 8 | 10 |
| | 5 | 10 | 15 | 20 | 25 |
| | 20 | 40 | 60 | 80 | 100 |
| | 200 | 400 | 600 | 800 | 1000 |

*Fig. 3*

PYRAMID-STYLE VIDEO GAME METHOD AND DEVICE

This Appln. claims benefit of Provisional No. 60/102,622 filed Oct. 1, 1998.

FIELD OF THE INVENTION

The present invention relates to electronic games such as wagering games or the like.

BACKGROUND OF THE INVENTION

One of the earliest prize devices was the bagatelle or drop case. The game is played by dropping a ball or coin into a case which contains an arrangement of pins. The ball or coin moves through the case, striking the pins as it falls. In doing so, the path of the ball or coin is disrupted and randomized. Upon reaching the bottom of the case, the ball or coin falls into a compartment, the location of which indicates the prize won by the player.

For example, Buchanan (U.S. Pat. No. 503,942) discloses a device which uses a series of pins to indiscriminately guide a coin into a series of compartments located at the bottom of a case. Similarly, Breyfogle (U.S. Pat. No. 1,053,473) discloses a vending machine in which an arrangement of pins randomizes the path of a coin as it falls toward a series of slots. The slot into which the coin is finally deposited determines the prize the player has won.

However, these games suffer from some shortcomings. First, the gambling industry is well aware that attrition rate of games can be high if the player is not stimulated. In the games disclosed by the prior art, the playing surface never changes and there are no chances to progress toward a bonus or win a large payoff. Thus, a player will tend to tire of the game quickly.

Further, the gambling industry requires precise figures as to the player's chances of winning. Similarly, the gambling industry needs the ability to change the odds of winning to stimulate the players and to control the amount of payoff. However, the prior art games are random and indiscriminate in their outcomes and give no control over the odds of winning to the operator.

Thus, it can be appreciated that there is a need in the art for a novel drop case game which is more exciting and stimulating to the player and gives the operator accurate winning percentages while allowing the operator the flexibility and power to change the winning percentages as the operator desires.

SUMMARY OF THE INVENTION

There is, set forth according to the present invention a method and device for a player to play a wagering game which includes a processor and a display controlled by the processor to display a pyramid or triangular shaped game board having an apex, a base and a plurality of pin locations depicted on the game board. In the preferred embodiment the pins are arranged in horizontal rows extending from the apex to the base. Also displayed at the base is a plurality of locations each of which defines an outcome for the game. Also according to the preferred embodiment at least one of the pins on the game board is designated as a horizontal shifting pin or point.

Means are provided for the player to make a wager to play the game and to prompt play. When play is prompted, a game character such as a point of light or an animated figure is displayed to fall from the apex to one of the locations at the base. As the game character encounters pins, its path is deflected to one side or other based upon a random selection of either a right or a left deflection. If the character encounters a lateral shift pin, the game character path is diverted or shifted horizontally. Ultimately, the character reaches a base location to define an outcome for the game. Certain of the locations are designated as winning outcomes for which the player receives an award with the remainder designated as losing outcomes for which the player's wager is lost.

According to further embodiments of the game, a plurality of shift pins may be provided and randomly positioned for each game. Additionally certain pins may be designated as automatic losers whereby if they are encountered by the game character as it falls to the base terminates the further progression of the game character to the base. Still further, a pin in the game board display may be designated as a second game character generator. If this pin is encountered by the game character, a second game character is initialized and falls with the first game character to the base whereby two outcomes are obtained.

Additionally the player may be permitted to designate certain outcomes as bonus outcomes which, if that location is obtained by a game character, results in a bonus to the player.

BRIEF DESCRIPTION OF THE DRAWINGS

These and other features and advantages of the present invention will become appreciated as the same becomes better understood with reference to the description, claims and drawings wherein;

FIG. 3 shows an example of a pay table for the game of FIG. 1 showing the pays based upon the number of units wagered.

DETAILED DESCRIPTION OF THE DRAWINGS

Figure 1:
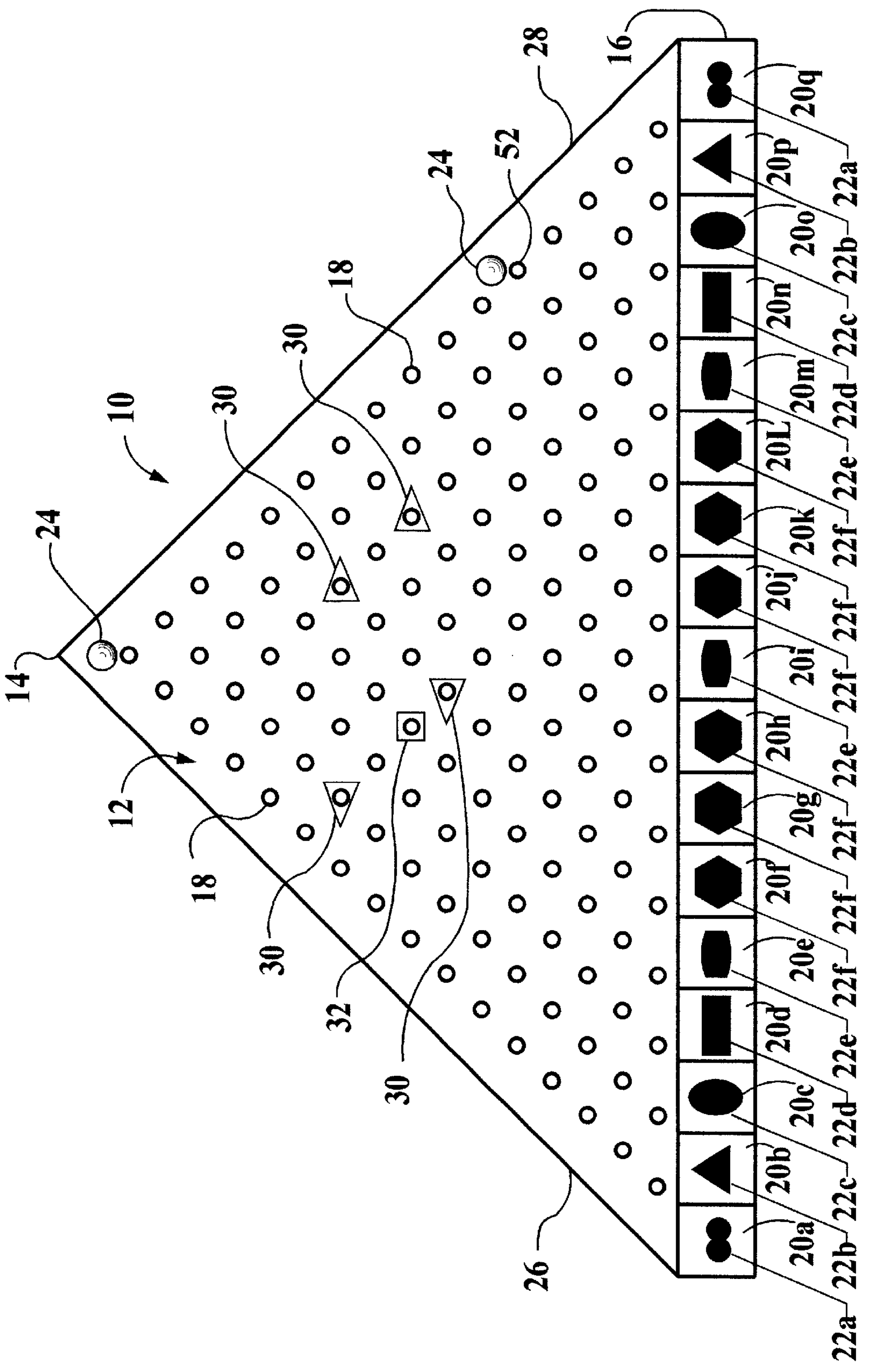
FIG. 1 shows a display in one embodiment of the game.

Turning to the drawings, FIG. 1 shows a display 10 the basic embodiment of the present invention. The display 10 can be any suitable electronic display device such as a video monitor, plasma display of other display devices as are well known in the art.

To control the display 10 and the features as hereinafter set forth, the device according to the present invention includes a computer processor (not shown) of a type well known in the art. The processor is programmed to control the display 10 and the other features of the game according to the present invention.

Also not shown in the drawings are means by which a player of the game may make a wager. These means are well known in the art and may consist of a token acceptor, cash validator and credit meter or the like. Accordingly, to play the game the player uses these wagering means to record a desired wager. It should be understood that where the game according to the present invention is played not as a casino game, that means are provided such as means for creating credits for a credit meter for wagering of fictitious credits.

The processor is programmed to generate the display 10 as shown in FIG. 1. The display 10 includes a pyramid or triangular game board 12 which has an apex 14 and a base 16. Between the apex 14 and base 16 there is included depictions of a plurality of pins 18 the purposes of which will hereinafter become evident. At the base 16 there is also depicted a plurality of locations 20*a–q* each of which will define an outcome for the game. Each location 20*a–q* or several of the locations 20*a–q* may be represented, as shown, by icons 22*a–f*, each icon 22*a–f* defining a particular outcome for the game.

Before the game is played, the operator must make several decisions about the conduct of the game. First, the operator must determine the payoffs for each playing icon 22*a–f*. FIG. 3 illustrates the preferred payout schedule corresponding to each playing icon 22*a–f* shown in FIGS. 1 and 2. As seen in FIG. 3, some of the icons 22*a–f* representing outcomes in the preferred embodiment have no payoff. The payout schedule is stored in a data structure such as read-only memory or re-writeable storage media which the processor may read.

Figure 4:
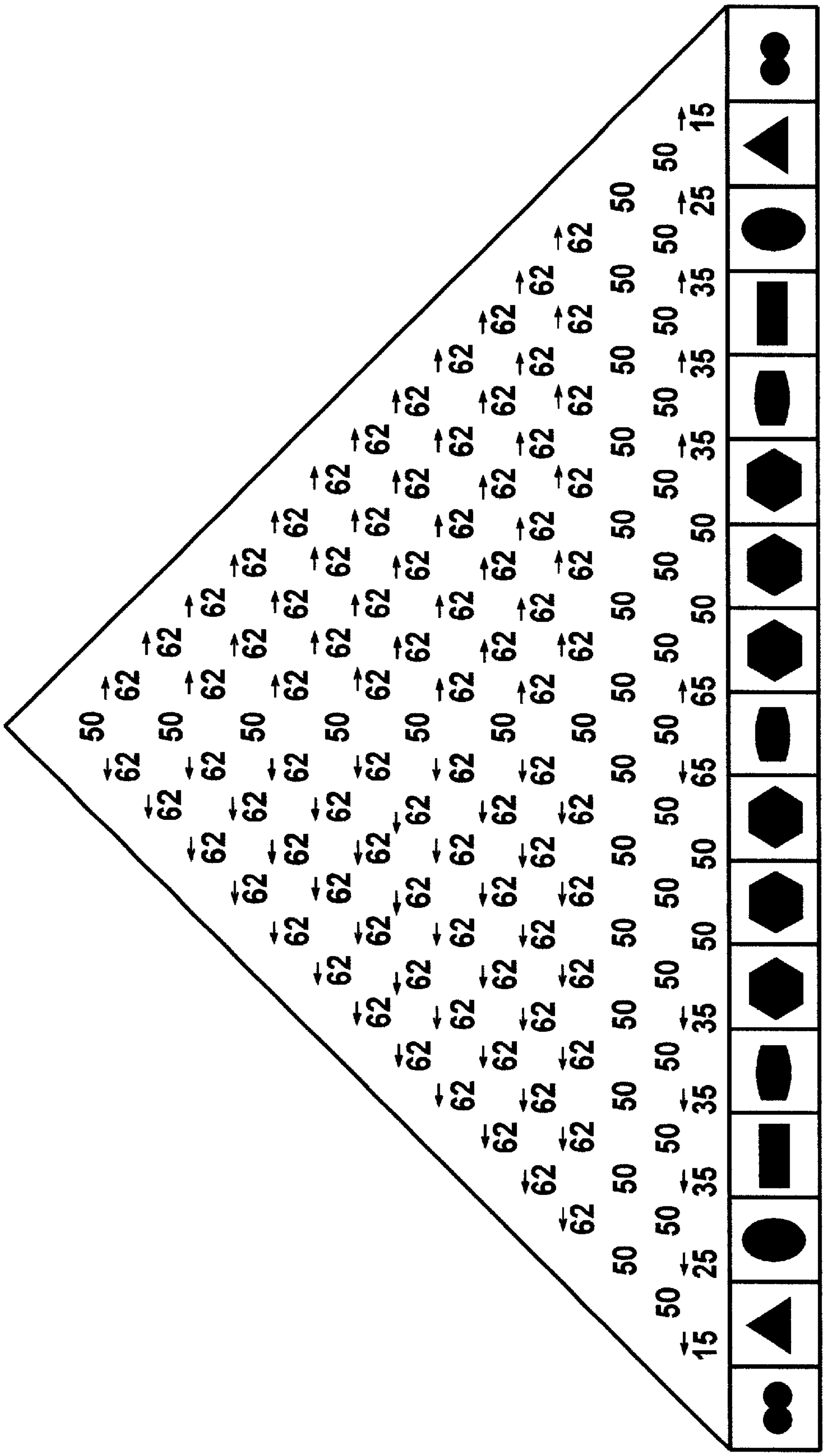
FIG. 4 shows an example of the probabilities assigned to each pin of the game for deflecting the game character to the right or left.

Second, the operator must set the probabilities that a game character such a ball 24, as shown in FIG. 1, will be deflected to either the right or left side when it encounters pin 18. These probabilities are also stored in a data structure accessible to the processor. Thus, the operator has almost complete control over the path of the ball 24 as it is depicted falling from the apex 14 to the base 16 and one of the locations 20*a–q*. For example, if the operator wishes the path to be completely random, the ball 24 would have an equal probability (50/50) of being deflected to either side when it hits a pin 18. In the preferred embodiment, each of the pins 18 is selected to have an equal probability of deflecting the ball 24 to either the right or the left. According to another embodiment, however, the upper pins 18 have a higher probability of moving the ball toward the boundaries 26, 28 of the game board 12 and the lower pins 18 have a higher probability of moving the ball 14 toward the center of the game board 12. Because the playing icons 22*a–f* with the highest payout are located near the boundaries 26, 28 of the game board 12, the ball 24 moves toward the higher paying playing icons 22*a–f* while the ball 24 is near the apex 14 but then is deflected away from them as it moves down the game board 12. This gives the player the illusion that the player has a better chance of winning than actually occurs, makes the game more exciting, and stimulates the player's interest. FIG. 4 illustrates the alternate probabilities that the ball will be deflected to the right or left when it encounters each pin.

Referring to FIG. 1, in the preferred embodiment, one or more pins 18 are designated as lateral shift pins 30. The display 10 may be controlled to identify these pins 30 as by depicting them with a pointer. The purpose of the lateral shift pins 30 is to shift the path of the ball 24 horizontally over to the next adjacent pin 18 in the pin matrix of the game board 12. Thus, contrary to a pin 18 which merely deflects the ball 24 to one side or the other, the shift pins 30 displace the generally downward path of the ball from the apex 14 to the base 16 laterally to the left or the right depending upon the configuration of the shift pin 30, i.e. in the direction of the pointer. Thus, as described below, when the ball 24 encounters a shift pin, its path is laterally shifted to thus give the player more opportunities to obtain a winning outcome and to increase the excitement of the game.

The display 10 may also, according to other embodiments, be controlled to display other features on the game board 12. As shown in FIG. 1, the game board 12 may be shown to include a bonus icon 32 at a pin 18. At the beginning of gaming session, the processor will randomly place a bonus icon 32 at a pin 18 on the lowest row of the game board 12. If the ball 24 hits a playing icon 22*a–f* which is a winning outcome, i.e. a pay off is obtained, without hitting the bonus icon 32, the bonus icon 32 is randomly placed on the next row of pins 18 up. If the ball 24 hits a icon 22*a–f* which does not pay off, without hitting the bonus icon 32, the bonus icon 32 remains in place. If the ball 24 hits the bonus icon 32, regardless of whether the ball 24 eventually hits a playing icon 22*a–f* which has a payoff, the bonus icon 32 is randomly placed on the lowest row of pins 18. When the bonus icon 32 reaches the top row pins 18 of the game board 12, the player wins a payoff which is determined by the operator and stored in a data structure accessible by the processor. In the preferred embodiment, the payoff is large to stimulate the player and encourage continued play. Moreover, the suspense generated by the progression towards a large payoff adds to the excitement of play.

A player begins a game by placing a wager. When the processor receives the signal that a wager has been received, the processor begins play by sending signals to the display 10 to represent the game character ball 24 falling from the apex 14 toward the base 16 and locations 20*a–q* containing the playing icons 22*a–f*. The processor also randomly locates the position of any shift pins 30 and bonus icons 32. As the ball 24 is shown falling down the game board 12 it encounters pins 18 which deflect the path of the ball 24 downwardly to the left or right. If the ball 24 encounters a shift pin 30 the path of the ball 24 is shifted laterally in the direction of the arrow of the shift pin 30. When the ball 24 reaches the base 16, the processor determines which location 20*a–q* the falling ball 24 contacts. The processor compares the result the playing icon 22*a–f* of the landing location 20*a–q* with the payoffs stored in the data structure to determine if the outcome of the game is a winning or a losing outcome. In one embodiment of the game, the playing icons 22*a–f* represent all the outcomes of the game. That is, the ball 24 will always hit a playing icon 22*a–f*, however, some of the playing icons 22*a–f* are designated as losing outcomes for which there is no payoff and some are designated winning outcomes for which there is a payoff.

If the processor determines that the ball 24 has landed at a location 20*a–q* defining a winning outcome, the processor controls the game to issue a reward to the player by dispensing coins from a hopper (not shown) or awarding credits to the player.

Figure 2:
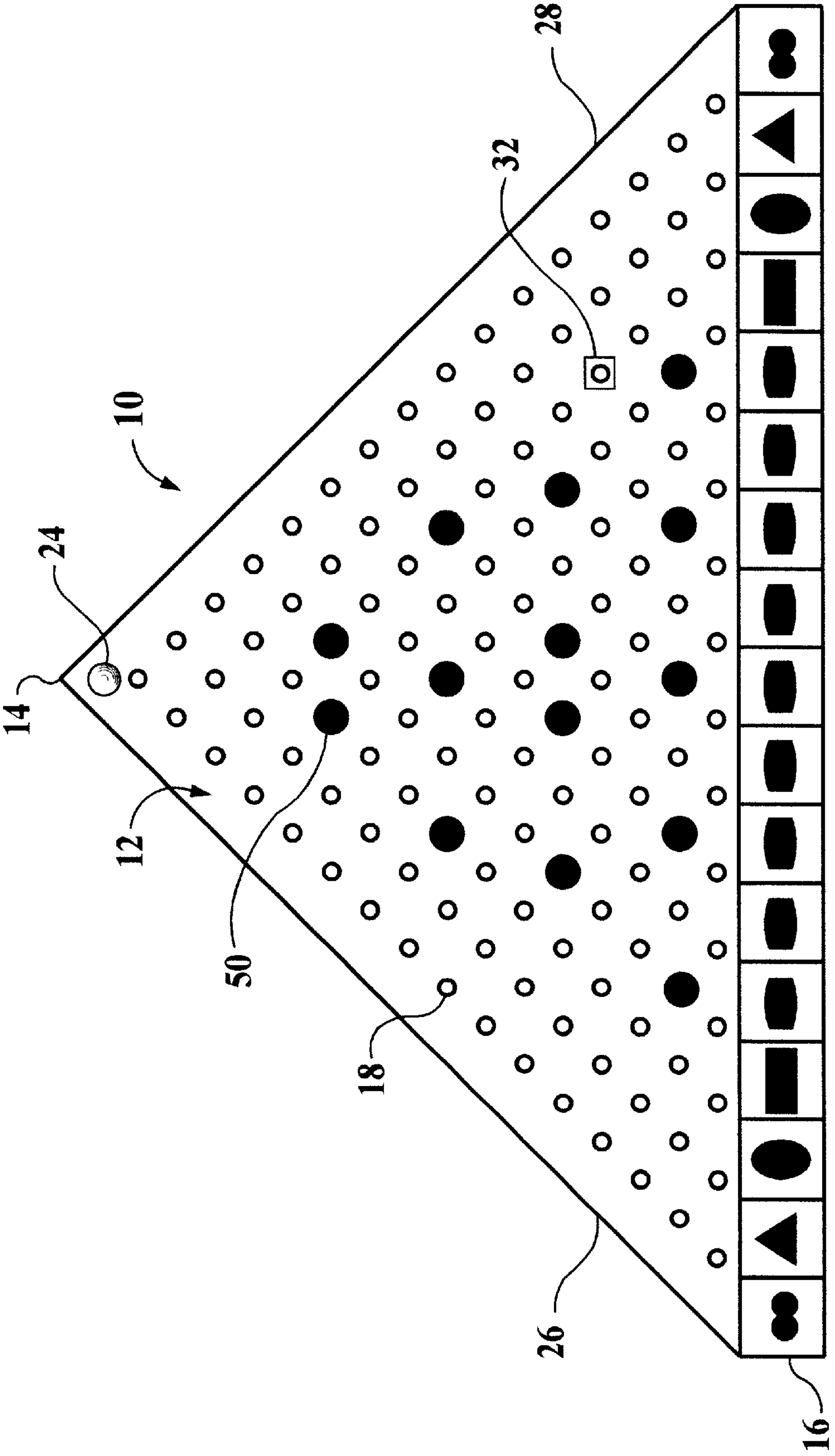
FIG. 2 shows a display in another embodiment of the game.

In an alternate embodiment of the game, some of the pins 18 may be indicated as stop pins 50 shown in FIG. 2. If the ball 24 encounters a stop pin 50, the travel of the ball 24 is terminated resulting in an immediate losing outcome for the player. In this embodiment, all playing icons 22*a–f* are designated as winning outcomes for which the player receives a reward.

Several features of the present invention are designed to capture the player's interest and stimulate play. The first is the doubler. This feature uses input means such as a button or a touch screen to allow the player to input to the processor which of the two highest paying playing icons 22*a–f* will pay an increased amount, e.g. double the normal payoff. Preferably, the payoff is large, as illustrated in FIG. 3, to stimulate the player and encourage play. The payoff is stored in a data structure accessible to the processor.

A second feature which can be incorporated into the game is a natural. A natural is a large payoff which occurs when the ball 24 hits one of the two highest paying playing icons 22*a–f* without hitting a shifting pin 30. Again, this payoff is preferably large to encourage play and create excitement and stimulation. This payoff is stored in a data structure accessible to the processor.

According to another embodiment, the processor at a start of a game may randomly assign to one or more pins 18 a designation of a secondary game character pin 52 (FIG. 1). If the ball 24 encounters a second game character pin 52, a second game character, e.g. another ball 24, is displayed and shown falling through the game board 12 in the manner described above. On this occurrence the player would have two balls 24 in play thus increasing the chances of obtaining a winning outcome.

As yet a further feature, the player may have the option of initiating a plurality of game characters each of which progresses in succession down the game board 12. For example, the player may double his wager to activate a second game character.

While the game character is described as a depiction of a ball it is to be understood that the game character could be an animated skier with the pins 18 depicted as gates on a skiing course or the like.

While I have shown and described certain embodiments of the present invention, it is to be understood that it is subject to many modifications without departing from the spirit and scope of the appended claims.

What is claimed is:

1. A method for playing a pyramid style electronic game comprising:

a processor;

a player entering a wager;

said processor displaying a video display pyramid shaped game board, said game board including an upper apex and a lower base including distinct locations defined along the base;

the processor further displaying pins on the game board distributed between the apex and base and at least one of said pins denoted as lateral shift pin;

the player prompting play of the game whereupon the processor controls a display to show a game character falling from the apex toward the base on the game board, said character deflected to the right or to the left upon encountering said pins and said character shifting one pin to the right or left upon encountering a lateral shift pin and said character ultimately falling to one of said locations;

the processor determining the location which received said character and comparing the location to a predetermined schedule of winning and losing locations and whereupon said game character has encountered a winning location issuing a reward to the player.

2. The method of claim 1 wherein said processor displays a plurality of lateral shift pins upon the game board.

3. The method of claim 2 wherein said processor displays the direction the game character will shift when encountering said lateral shift pin.

4. The method of claim 3 wherein said processor randomly selects the locations of the lateral shift pins.

5. The method of claim 1 wherein said processor displays at least one stop pin upon the game board;

said processor determines whether said game character encounters said stop pin and whereupon the game character encounters a stop pin stops the progression of the game character and ends that specific game.

6. The method of claim 1 wherein said processor displays upon one of said pins a second game character indicator;

said processor determines whether said game character encounters said second game character indicator and whereupon said game character encounters a second game character indicator displays a second game character progressing the game board.

7. The method of claim 1 wherein said processor displays said pins in horizontal rows from the apex to the base and includes a bonus pin;

said processor determines whether said game character avoids said bonus pin as it progresses the game board and whereupon said game character avoids said bonus pin displays said bonus pin in a row nearer the apex during the following game;

and whereupon the bonus pin reaches the apex said processor issues a bonus to the player.

8. The method of claim 7 wherein said processor displays said bonus pin in a row nearest the base the game following said game character encountering the bonus pin.

9. An electronic game device comprising:

a triangular game board;

a processor;

said processor controls an electronic display;

said electronic display includes an apex, a base, pins between the apex and base, and a plurality of distinct locations along the base;

at least one of said pins designated a lateral shift pin;

means for a player to make a wager;

means for the player to prompt play of the game whereby said processor displays a game character progressing from said apex, through the game board, to a said location along the base;

said pins deflect said game character and said at least one lateral shift pin horizontally shifts said game character one pin to the right or to the left;

said processor determining the location which received said character and comparing the location to a predetermined schedule of winning and losing locations and whereupon said game character has encountered a winning location issuing a reward to the player.

10. The device of claim 9 wherein said processor displays a plurality of lateral shift pins upon the game board.

11. The device of claim 9 wherein said processor randomly selects the locations of the lateral shift pins.

12. The device of claim 11 wherein said processor displays the direction the game character will shift when encountering said lateral shift pin.

13. The device of claim 9 wherein said processor displays upon one of said pins a second game character indicator;

said processor determines whether said game character encounters said second game character indicator and whereupon said game character encounters a second game character indicator displays a second game character progressing the game board.

* * * * *